US006496975B1

(12) United States Patent
Slinger

(10) Patent No.: US 6,496,975 B1
(45) Date of Patent: Dec. 17, 2002

(54) METHOD, SYSTEM, AND PROGRAM FOR PERFORMING CONDITIONAL PROGRAM OPERATIONS

(75) Inventor: Nigel G. Slinger, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/419,160

(22) Filed: Oct. 15, 1999

(51) Int. Cl.[7] .................................................. G06F 9/44
(52) U.S. Cl. ...................... 717/126; 717/151; 717/114
(58) Field of Search .......................... 717/1, 100–119, 717/151–161, 126; 434/1; 712/234, 245, 227, 43; 711/163; 703/27; 709/203, 300, 200, 310; 707/10

(56) References Cited

U.S. PATENT DOCUMENTS

| | | | |
|---|---|---|---|
| 4,967,351 A | 10/1990 | Zmyslowski et al. | 712/234 |
| 5,081,572 A | 1/1992 | Arnold | 711/163 |
| 5,167,023 A | 11/1992 | de Nicolas et al. | 703/27 |
| 5,497,463 A | 3/1996 | Stein et al. | 709/203 |
| 5,526,491 A | 6/1996 | Wei | 709/330 |
| 5,659,722 A | 8/1997 | Blaner et al. | 712/234 |
| 5,706,490 A * | 1/1998 | Beard et al. | 712/234 |
| 5,748,951 A | 5/1998 | Webb et al. | 712/245 |
| 5,790,844 A | 8/1998 | Webb et al. | 712/227 |
| 5,805,876 A | 9/1998 | Bose et al. | 712/234 |
| 5,805,918 A | 9/1998 | Blomgren et al. | 712/43 |
| 5,881,229 A * | 3/1999 | Singh et al. | 709/203 |
| 6,119,116 A * | 9/2000 | Rose | 707/10 |

OTHER PUBLICATIONS

IBM BookManager Print Preview; "MVS JCL Reference"; Document No. GC28–1757–05; Program No. 5647–A01; Nov. 4, 1998, Sections of Ch. 16 and 17.
IBM BookManager Print Preview; "MVS JCL User's Guide"; Document No. GC28–1758–03; Program No. 5647–A01; Jan. 28, 1998, Sections from Ch. 3.

* cited by examiner

*Primary Examiner*—Tuan Q. Dam
*Assistant Examiner*—Hoang-Vu Antony Nguyen-Ba
(74) *Attorney, Agent, or Firm*—David W. Victor; Konrad Raynes Victor & Mann LLP

(57) ABSTRACT

Disclosed is a system, method, and program for implementing conditional logic statements within a computer program. Program logic is invoked in response to processing a first method statement. During the execution of the program logic for the first method statement, at least one operation is performed and a return variable is set to at least one of two values depending on an outcome of performing the at least one operation. Program logic is invoked in response to processing a second method statement following the first method statement in the computer program. The second method statement is passed a condition parameter and the return variable. During the execution of the program logic for the second method statement, a determination is made as to whether the return variable set by the first method statement satisfies a condition specified in the condition parameter and one of at least two operations are performed, depending on whether the return variable satisfies the condition.

45 Claims, 1 Drawing Sheet

METHOD, SYSTEM, AND PROGRAM FOR PERFORMING CONDITIONAL PROGRAM OPERATIONS

BACKGROUND OF THE INVENTION

1. Field of the Invention

The present invention relates to a method, system, and program for implementing conditional logic and, in particular, nested conditional logic within a computer program.

2. Description of the Related Art

Certain complex program coding requires the use of multiple nested conditional logic. Below is an example (1) of the use of nested conditional statements to determine whether a process will continue to request blocks of data.

Get a block        (1)

If block OK Then
    Get another block
    If block OK Then
    Get another block
    If block OK Then
        Get another block
        If block OK Then
            say hello
        Else
            say goodbye
    Else
        Error
    Else
        Error
Else
    Error In the above example (1), the programmer must keep track of numerous nested conditional statements in order to implement a series of commands to get blocks of data, as a failure to get one block will prevent the logic from obtaining the next block. The programmer must also ensure that the "Else" statements correspond to "If" statements. The layout of the "if" and "else" statements to implement nested conditional logic can be confusing and time consuming to organize.

Thus, there is a need in the art for an improved method, system, and program for implementing conditional logic.

SUMMARY OF THE PREFERRED EMBODIMENTS

To address the shortcomings in the prior art discussed above, preferred embodiments disclose a method, system, and program for implementing conditional logic statements within a computer program. Program logic is invoked in response to processing a first method statement. During the execution of the program logic for the first method statement, at least one operation is performed and a return variable is set to at least one of two values depending on an outcome of performing the at least one operation. Program logic is invoked in response to processing a second method statement following the first method statement in the computer program. The second method statement is passed a condition parameter and the return variable. During the execution of the program logic for the second method statement, a determination is made as to whether the return variable set by the first method statement satisfies a condition specified in the condition parameter and one of at least two operations are performed, depending on whether the return variable satisfies the condition.

In further embodiments, the step of performing one of at least two operations is dependent on whether the return variable satisfies the condition comprises performing at least one operation specified in the program logic for the second method statement if the return variable satisfies the condition or bypassing performing any operations specified in the second method statement if the return variable does not satisfy the condition.

In still further embodiments, the computer program further comprises additional method statements following the second method statement. The method statements following the second program statement are passed at least one condition parameter and the return variable. During the execution of the program logic for the method statements following the first method statement, at least one operation is performed depending on whether the return variable satisfies the condition specified in the at least one condition parameter and the return variable is set to one of the two values depending on the outcome of performing the operation.

In still further embodiments, the same operations are performed by the method statements following the first method statement and the same condition parameters are passed to the method statements following the first method statement. Still further, the series of method statements may form nested conditional logic.

Preferred embodiments provide a technique to implement conditional logic that is less cumbersome than current methods that utilize "if" and "else" statement pairs, especially when numerous if/else pairs are nested within each other. With preferred embodiments, the conditional logic is implemented within a method statement that performs a certain operation conditional on specified condition parameters and a return value set during the execution of a previous method statement. In this way, nested conditional logic can be implemented with a series of single program statements without the need to organize the layout of "if" and "else" pairs within each other.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

Figure 1:
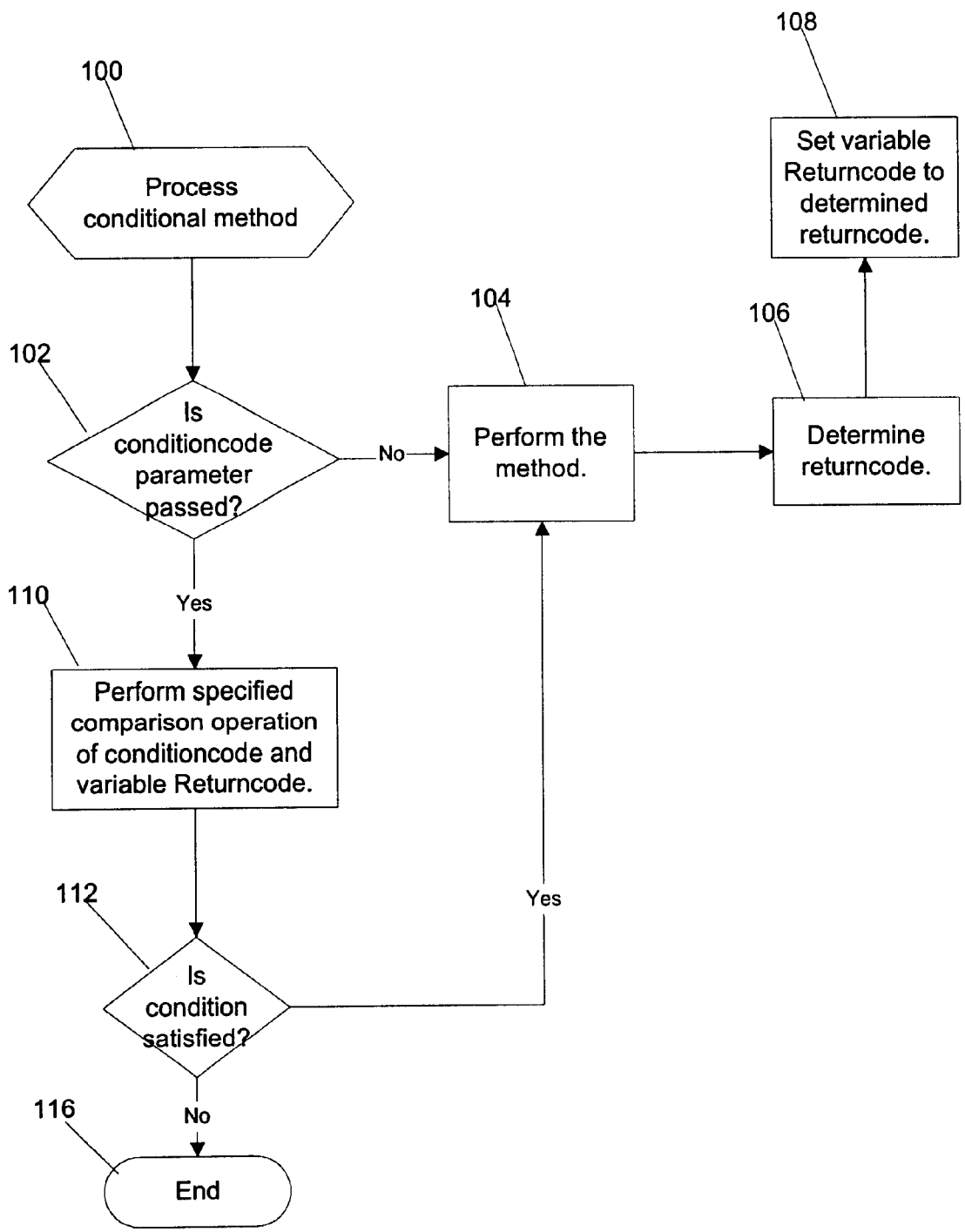
FIG. 1 illustrates logic to process conditional method statements in accordance with the present invention are implemented.

In the following description, reference is made to the accompanying drawings which form a part hereof, and which illustrate several embodiments of the present invention. It is understood that other embodiments may be utilized and structural and operational changes may be made without departing from the scope of the present invention.

Preferred embodiments comprise computer program language statements to encode nested conditional statements in a source program that is compiled and translated into machine readable object code which is then loaded into memory and executed by a processing unit. Thus, the preferred embodiments are preferably implemented as source language statements, in object oriented as well as non-object oriented computer languages. A method to perform an operation may be called with one or two parameters as shown below with methods (2) and (3) to get a block of data $$\text{method\_getblock(Returncode:=returncode)} \quad (2)$$

$$\text{method\_getblock(Returncode:=returncode, conditioncode:=returncode)} \quad (3)$$

The Returncode variable is set to a returncode generated in response to executing the method. For instance, in the first method call (2) to retrieve the block, the value of Returncode depends on whether the getblock operation completed successfully. For any method calls whose execution is conditional on the results of a previous execution of a method call, the conditioncode is used to check the value of the Returncode from the previous operation. Returncode is the variable set to the returncode generated during the previous invocation of the method that is passed to the next method call and compared to the conditioncode to determine whether to execute such next method call.

The conditional check to determine whether to execute the method is performed by performing the comparison operation specified in the conditioncode and operand against the Returncode based. In the method call (3), a comparison is made as to whether the conditioncode equals the Returncode. If so, the method getblock is executed to retrieve a block, otherwise, the method is not executed. Other types of comparisons of the conditioncode and Returncode may be made. For instance, a determination could be made as to whether the conditioncode is greater or less than the Returncode or whether the operation of some function against the Returncode produces the conditioncode value. Moreover, in alternative embodiments, the Returncode may be other values than an outcome indicator of the operation. For instance, the Returncode may comprise output generated during the execution of the method.

FIG. 1 illustrates logic of how the preferred method statements would control a computer when converted into machine readable object language to implement conditional functionality. Control begins at block 100 with the computer processing a conditional method. If a conditioncode parameter is not passed (at block 102), then the computer generates (at block 104) performs the method and determines (at block 106) the returncode, which may be an outcome of the operation or a variable set during the A execution of the method. The computer then sets (at block 108) the variable Returncode to the determined returncode. If the conditioncode parameter is passed, then the computer performs (at block 110) the specified comparison operation of conditioncode and the Returncode, set during the execution of a previous conditional method. As discussed, the comparison operation may comprise determining whether the conditioncode equals, is less than or greater than the Returncode. If the condition is satisfied (at block 112), then control returns to block 104 to perform the method and set a new value for the Returncode depending on the outcome of the execution of the subsequent method. Otherwise, if the conditioncode parameters is not set, then the method is not executed and the processing ends.

If a series of conditional methods are provided, then a setting of the Returncode to a value that does not pass the condition testing with the conditioncode would prevent the execution of all following conditional methods which consider that Returncode. Thus, with the preferred embodiments, each conditional method including the conditioncode parameter following another conditional method functions as a nested conditional statement with respect to the previous conditional method. If the programmer wants to create another series of nested conditional checking, then the programmer would start the series of conditional statements with a conditional method that does not include the conditioncode, i.e., the conditional method (2), executes without conditioncode checking, and initializes the Returncode variable for the following method statements that utilize that Returncode in their condition testing.

The prior art nested conditional logic using if/lese statements shown in example (1) above may be implemented in preferred embodiments using the preferred embodiment conditional method-getblock which produces the returncode indicating an outcome of getting the block of data. For instance, if the block is successfully accessed, then the Returncode is zero (0) and if the block is not successfully accessed, the Returncode is a non-zero value. Nested logic (4) below illustrates how the preferred embodiment conditional methods may be used to implement the nested loop statements known in the art and shown in example (1) above.

$$\text{method\_getblock(Returncode:=Returncode)} \quad (4)$$

$$\text{method\_getblock (Returncode:=returncode, conditioncode:=Returncode)}$$

$$\text{method\_getblock (Returncode:=returncode, conditioncode:=Returncode)}$$

$$\text{method\_getblock (Returncode:=Returncode, conditioncode:=Returncode)}$$

If Returncode:=0, then say hello

Else say goodbye

With the nested logic (4), the failure of any one method-getblock to access the block causes the Returncode to set to a nonzero value, which would propagate down to the subsequent method_getblocks to cause the condition checking to block the execution of the conditional method. If all the getblock operations successfully complete, then "hello" is returned and if one of the getblock operations fails to complete, "goodbye" is returned.

As can be seen by comparing the prior art method of coding nested loops in example (1) and the nested loop logic of the preferred embodiments (4), preferred embodiments provide a more compact, easier to comprehend and construct language structure to implement nested loop logic. For instance, with preferred embodiments only one series of statements are needed. Whereas, in the prior art, two sets of the statements are needed, one for the "if" side and the other for the "else" side of the conditional logic.

In preferred embodiments, the logic for the conditional method implicitly performs both the "if" and "else" functions. The conditional method may include code to cause certain operations to occur upon the presence of different conditions. Although within the conditional method conditional logic known in the art may be used, the conditional method itself provides a simplified mechanism to implement nested conditional logic because the programmer need only use the conditional method statement to implement what would otherwise require "if" and "else" statements.

The above embodiments described the use of a single Returncode value and single condition parameter to control execution of the conditional method. However, in further embodiments the conditional methods may be capable of responding to multiple Returncodes or specify a certain action depending on the presence of multiple return codes. In this way different Returncodes could be passed to a conditional method to trigger different conditional logic paths. A conditional method may generate multiple different Returncodes depending on the outcome state of its operation. For instance, the possible outcomes of the getblock conditional method may be completed, error or system busy. Thus, the Returncode could have three possible values, completed, error or busy. The next called conditional method could include logic to respond to each of these three possible states. For instance, in the event of a completed operation, the getblock procedure is performed; in the event of error, the getblock procedure is not performed; and in the event of busy, a predetermined period of time must elapse before attempting the getblock procedure. Another Returncode value could be used to cause the conditional method to perform its operation, e.g., get the block, without performing any checking within the conditional method or affecting the Returncode value.

In further embodiments, multiple condition parameters as well as multiple return codes may be specified to perform mutli-layered condition checking to determine a course of action. The conditional checking may utilize only one Returncode or multiple Returncodes.

In this way preferred embodiments provide the use of conditional methods within programs and subroutines to provide the programmer a more efficient mechanism to implement nested conditional logic. As discussed, in the prior art, to implement complex nested conditional logic, one would need to use a series of sets of "if" and "else" which could be time consuming to layout and review. With the preferred embodiments, only one conditional method program statement is needed in place of multiple "if" and "else" statements.

Alternative Embodiments and Conclusions

This concludes the description of the preferred embodiments of the invention. The following describes some alternative embodiments for accomplishing the present invention. The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

Preferred embodiments provided a specific set of parameters, such as the Returncode and conditioncode. In alternative embodiments, these parameters may have different names. Further the format of the parameters to set a Returncode value used in subsequent conditional checking with a conditioncode may vary, and require more or fewer parameters in the conditional statements of the preferred embodiments.

Preferred embodiments may be implemented in the method or function calls used within any programming language, including object oriented programming languages such as JAVA and C++, and other languages such as FORTRAN, COBOL, etc.

In summary, the present invention provides a system, method, and program for implementing conditional logic statements within a computer program. Program logic is invoked in response to processing a first method statement. During the execution of the program logic for the first method statement, at least one operation is performed and a return variable is set to at least one of two values depending on an outcome of performing the at least one operation. Program logic is invoked in response to processing a second method statement following the first method statement in the computer program. The second method statement is passed a condition parameter and the return variable. During the execution of the program logic for the second method statement, a determination is made as to whether the return variable set by the first method statement satisfies a condition specified in the condition parameter and one of at least two operations are performed, depending on whether the return variable satisfies the condition.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing conditional logic statements within a computer program, comprising:

invoking program logic in response to processing a first method statement;

performing at least one operation during the execution of the program logic for the first method statement;

setting, during an execution of the program logic for the first method statement, a return variable to at least one of two values depending on an outcome of performing the at least one operation;

invoking program logic in response to processing a second method statement following the first method statement in the computer program, wherein the second method statement is passed a condition parameter and the return variable;

determining, during the execution of the program logic for the second method statement, whether the return variable set by the first method statement satisfies a condition specified in the condition parameter; and performing, during the execution of the program logic for the second method statement, one of at least two operations depending on whether the return variable satisfies the condition specified in the condition parameter.

2. The method of claim 1, wherein setting, during the execution of the program logic for the first method statement, the return variable to one of two values comprises setting the return variable to a first value if performing the at least one operation completes successfully and setting the return variable to a second value if performing the at least one operation does not complete successfully, wherein the first value satisfies the condition specified in the condition parameter and the second value does not satisfy the condition specified in the condition parameter.

3. The method of claim 1, wherein performing, during the execution of the program logic for the second method statement, one of at least two operations depending on whether the return variable satisfies the condition specified in the condition parameter comprises:

performing at least one operation specified in the program logic for the second method statement if the return variable satisfies the condition specified in the condition parameter; and bypassing performing any operations specified in the second method statement if the return variable does not satisfy the condition specified in the condition parameter.

4. The method of claim 3, wherein the return variable does not satisfy the condition specified in the condition parameter if operations performed during the execution of the program logic for the first method statement did not complete successfully.

5. The method of claim 1, wherein the computer program further comprises additional method statements following the second method statement, wherein the method statements following the second program statement are passed at least one condition parameter and the return variable, and further comprising:

performing, during the execution of the program logic for the method statements following the first method statement, at least one operation dependent on whether the return variable satisfies a condition specified in the at least one condition parameter; and setting, during the execution of the program logic for the method statements following the first method statement, the return variable to one of the two values depending on an outcome of performing the at least one operation.

6. The method of claim 5, wherein same operations are performed by the method statements following the first method statement and same condition parameters are passed to the method statements following the first method statement.

7. The method of claim 5, wherein the method statements form nested conditional logic.

8. The method of claim 5, wherein operations performed by the method statements and the condition parameters for the method statements following the first method statement are different.

9. The method of claim 5, wherein performing, during the execution of the program logic for the method statements following the first method statement, one of at least two operations dependent on whether the return variable satisfies the condition specified in the condition parameter comprises:

performing at least one operation specified in the program logic for the method statements following the first method statement if the return variable satisfies the condition specified in the condition parameter; and bypassing performing any operations specified in the method statements following the first method statement if the return variable does not satisfy the condition specified in the condition parameter.

10. The method of claim 1, wherein there are multiple return variables and wherein there are multiple condition parameters specified for the second method statement, further comprising:

setting, during the execution of the program logic for the first method statement, all of the return variables to one of multiple values depending on an outcome of performing the at least one operation during execution of the program logic for the first method statement; and determining, during the execution of the program logic for the second method statement, whether each return variable satisfies at least one condition specified in the condition parameters.

11. The method of claim 1, wherein the second method statement is passed the condition parameter and the return variable from one immediately previously executed method statement, and wherein the second method statement does not identify the one immediately previously executed method statement.

12. The method of claim 1, wherein the method statements are used to substitute code, and wherein the code includes nested conditional logic.

13. The method of claim 12, wherein the nested conditional logic includes if-then-else statements.

14. The method of claim 12, wherein the code that is substituted is existing code in a legacy programming system.

15. The method of claim 1, wherein the program logic for the second method statement is executed only after the program logic for the first method statement has completed execution.

16. A system for implementing conditional logic statements within a computer program, comprising:

means for invoking program logic in response to processing a first method statement;

means for performing at least one operation during the execution of the program logic for the first method statement;

means for setting, during an execution of the program logic for the first method statement, a return variable to at least one of two values depending on an outcome of performing the at least one operation;

means for invoking program logic in response to processing a second method statement following the first method statement in the computer program, wherein the second method statement is passed a condition parameter and the return variable;

means for determining, during the execution of the program logic for the second method statement, whether the return variable set by the first method statement satisfies a condition specified in the condition parameter; and means for performing, during the execution of the program logic for the second method statement, one of at least two operations depending on whether the return variable satisfies the condition specified in the condition parameter.

17. The system of claim 16, wherein the means for setting, during the execution of the program logic for the first method statement, the return variable to one of two values comprises setting the return variable to a first value if performing the at least one operation completes successfully and setting the return variable to a second value if performing the at least one operation does not complete successfully, wherein the first value satisfies the condition specified in the condition parameter and the second value does not satisfy the condition specified in the condition parameter.

18. The system of claim 16, wherein the means for performing, during the execution of the program logic for the second method statement, one of at least two operations depends on whether the return variable satisfies the condition specified in the condition parameter comprises:

means for performing at least one operation specified in the program logic for the second method statement if the return variable satisfies the condition; and means for bypassing performing any operations specified in the second method statement if the return variable does not satisfy the condition.

19. The system of claim 18, wherein the return variable does not satisfy the condition specified in the condition parameter if operations performed during the execution of the program logic for the first method statement did not complete successfully.

20. The system of claim 16, wherein the computer program further comprises additional method statements following the second method statement, wherein the method statements following the second program statement are passed at least one condition parameter and the return variable, and further comprising:

means for performing, during the execution of the program logic for the method statements following the first method statement, at least one operation depending on whether the return variable satisfies a condition specified in the at least one condition parameter; and means for setting, during the execution of the program logic for the method statements following the first method statement, the return variable to one of the two values depending on an outcome of performing the at least one operation.

21. The system of claim 20, wherein same operations are performed by the method statements following the first method statement and same condition parameters are passed to the method statements following the first method statement.

22. The system of claim 20, wherein the method statements form nested conditional logic.

23. The system of claim 20, wherein operations performed by the method statements and the condition parameters for the method statements following the first method statement are different.

24. The system of claim 20, wherein the means for performing, during the execution of the program logic for the method statements following the first method statement, one of at least two operations depending on whether the return variable satisfies the condition comprises:

means for performing at least one operation specified in the program logic for the method statements following the first method statement if the return variable satisfies the condition; and means for bypassing performing any operations specified in the method statements following the first method statement if the return variable does not satisfy the condition specified in the condition parameter.

25. The system of claim 16, wherein there are multiple return variables and wherein there are multiple condition parameters specified for the second method statement, further comprising:

means for setting, during the execution of the program logic for the first method statement, all of the return variables to one of multiple values depending on an outcome of performing the at least one operation during execution of the program logic for the first method statement; and means for determining, during the execution of the program logic for the second method statement, whether each return variable satisfies at least one condition specified in the condition parameters.

26. The system of claim 16, wherein the second method statement is passed the condition parameter and the return variable from one immediately previously executed method statement, and wherein the second method statement does not identify the one immediately previously executed method statement.

27. The system of claim 16, wherein the method statements are used to substitute code, and wherein the code includes nested conditional logic.

28. The system of claim 27, wherein the nested conditional logic includes if-then-else statements.

29. The system of claim 27, wherein the code that is substituted is existing code in a legacy programing system.

30. The system of claim 16, wherein the program logic for the second method statement is executed only after the program logic for the first method statement has completed execution.

31. An article of manufacture for use in implementing conditional logic statements, the article of manufacture comprising computer useable media including at least one computer program capable of causing the at least one computer to perform:

invoking program logic in response to processing a first method statement;

performing at least one operation during an execution of the program logic for the first method statement;

setting, during the execution of the program logic for the first method statement, a return variable to at least one of two values depending on an outcome of performing the at least one operation;

invoking program logic in response to processing a second method statement following the first method statement in the computer program, wherein the second method statement is passed a condition parameter and the return variable;

determining, during the execution of the program logic for the second method statement, whether the return variable set by the first method statement satisfies a condition specified in the condition parameter; and performing, during the execution of the program logic for the second method statement, one of at least two operations depending on whether the return variable satisfies the condition specified in the condition parameter.

32. The article of manufacture of claim 31, wherein setting, during the execution of the program logic for the first method statement, the return variable to one of two values comprises setting the return variable to a first value if performing the at least one operation completes successfully and setting the return variable to a second value if performing the at least one operation does not complete successfully, wherein the first value satisfies the condition specified in the condition parameter and the second value does not satisfy the condition specified in the condition parameter.

33. The article of manufacture of claim 31, wherein performing, during the execution of the program logic for the second method statement, one of at least two operations depending on whether the return variable satisfies the condition specified in the condition parameter comprises:

performing at least one operation specified in the program logic for the second method statement if the return variable satisfies the condition; and bypassing performing any operations specified in the second method statement if the return variable does not satisfy the condition specified in the condition parameter.

34. The article of manufacture of claim 33, wherein the return variable does not satisfy the condition if operations performed during the execution of the program logic for the first method statement did not complete successfully.

35. The article of manufacture of claim 31, wherein the computer program further comprises additional method statements following the second method statement, wherein the method statements following the second program statement are passed at least one condition parameter and the return variable, and further comprising:

performing, during the execution of the program logic for the method statements following the first method statement, at least one operation dependent on whether the return variable satisfies a condition specified in the at least one condition parameter; and setting, during the execution of the program logic for the method statements following the first method statement, the return variable to one of the two values depending on an outcome of performing the at least one operation.

36. The article of manufacture of claim 35, wherein same operations are performed by the method statements following the first method statement and same condition parameters are passed to the method statements following the first method statement.

37. The article of manufacture of claim 35, wherein the method statements form nested conditional logic.

38. The article of manufacture of claim 35, wherein operations performed by the method statements and the condition parameters for the method statements following the first method statement are different.

39. The article of manufacture of claim 35, wherein performing, during the execution of the program logic for the method statements following the first method statement, one of at least two operations dependent on whether the return variable satisfies the condition comprises:

performing at least one operation specified in the program logic for the method statements following the first method statement if the return variable satisfies the condition; and bypassing performing any operations specified in the method statements following the first method statement if the return variable does not satisfy the condition specified in the condition parameter.

40. The article of manufacture of claim 31, wherein there are multiple return variables and wherein there are multiple condition parameters specified for the second method statement, further comprising:

setting, during the execution of the program logic for the first method statement, all of the return variables to one of multiple values depending on an outcome of performing the at least one operation during execution of the program logic for the first method statement; and determining, during the execution of the program logic for the'second method statement, whether each return variable satisfies at least one condition specified in the condition parameters.

41. The article of manufacture of claim 31, wherein the second method statement is passed the condition parameter and the return variable from one immediately previously executed method statement, and wherein the second method statement does not identify the one immediately previously executed method statement.

42. The article of manufacture of claim 31, wherein the method statements are used to substitute code, and wherein the code includes nested conditional logic.

43. The article of manufacture of claim 42, wherein the nested conditional logic includes if-then-else statements.

44. The article of manufacture of claim 42, wherein the code that is substituted is existing code in a legacy programming system.

45. The article of manufacture of claim 31, wherein the program logic for the second method statement is executed only after the program logic for the first method statement has completed execution.

* * * * *

UNITED STATES PATENT AND TRADEMARK OFFICE
CERTIFICATE OF CORRECTION

| | | |
|---|---|---|
| PATENT NO. | : 6,496,975 B1 | Page 1 of 1 |
| APPLICATION NO. | : 09/419160 | |
| DATED | : December 17, 2002 | |
| INVENTOR(S) | : Nigel G. Slinger | |

It is certified that error appears in the above-identified patent and that said Letters Patent is hereby corrected as shown below:

Column 10, line 4, delete "programing" and insert -- programming -- .

Column 12, line 13, delete "the'second" and insert -- the second -- .

Signed and Sealed this

Twenty-sixth Day of December, 2006

JON W. DUDAS
*Director of the United States Patent and Trademark Office*